United States Patent
Teusch

(10) Patent No.: US 11,289,922 B2
(45) Date of Patent: Mar. 29, 2022

(54) METHOD AND SYSTEM FOR OPERATING ELECTRICAL ENERGY STORES

(71) Applicant: Robert Bosch GmbH, Stuttgart (DE)

(72) Inventor: Stefan Teusch, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 223 days.

(21) Appl. No.: 16/653,254

(22) Filed: Oct. 15, 2019

(65) Prior Publication Data

US 2020/0119566 A1 Apr. 16, 2020

(30) Foreign Application Priority Data

Oct. 16, 2018 (DE) .......................... 102018217665.5

(51) Int. Cl.
*H02J 7/00* (2006.01)
*H02J 7/14* (2006.01)
*B60L 58/22* (2019.01)
*B60L 50/60* (2019.01)

(52) U.S. Cl.
CPC ............ *H02J 7/0026* (2013.01); *B60L 50/66* (2019.02); *B60L 58/22* (2019.02); *H02J 7/0014* (2013.01)

(58) Field of Classification Search
USPC ................................................. 320/134, 137
See application file for complete search history.

(56) References Cited

U.S. PATENT DOCUMENTS

| | | | | |
|---|---|---|---|---|
| 7,971,665 B2 * | 7/2011 | Tumback | ............. | B60W 20/00 180/65.21 |
| 9,091,737 B2 * | 7/2015 | Tzivanopoulos | ... | H01M 10/482 |
| 9,525,295 B2 * | 12/2016 | Kern | ...................... | H02J 7/1423 |
| 9,937,810 B2 * | 4/2018 | Saussele | ................... | G05F 1/10 |
| 2012/0046892 A1 * | 2/2012 | Fink | ...................... | G01R 31/389 702/63 |
| 2012/0306468 A1 * | 12/2012 | Butzmann | ............. | H02J 7/1423 323/304 |
| 2013/0035816 A1 * | 2/2013 | Pettigrew | ............. | B60L 3/0061 701/22 |
| 2013/0175995 A1 * | 7/2013 | Butzmann | ............... | B60L 58/21 320/121 |
| 2014/0035361 A1 * | 2/2014 | Schmidt | .................. | B60L 50/51 307/10.1 |
| 2015/0364935 A1 * | 12/2015 | Fetzer | ................... | H02J 7/0016 318/139 |
| 2017/0082693 A1 * | 3/2017 | Leidich | ................. | H01M 10/48 |
| 2019/0036356 A1 * | 1/2019 | Subbaraman | ......... | H02J 7/0021 |

FOREIGN PATENT DOCUMENTS

WO 2017004446 A1 5/2010

* cited by examiner

*Primary Examiner* — Alexis B Pacheco
(74) *Attorney, Agent, or Firm* — Norton Rose Fulbright US LLP; Gerard Messina

(57) ABSTRACT

A method for operating electrical energy stores, in particular for use in motor vehicles, the method including: ascertaining a charge state of a first energy store with the aid of an evaluation unit, ascertaining a charge state of a second energy store with the aid of an evaluation unit, ascertaining an instantaneous power demand with the aid of an evaluation unit, adapting an operation of at least one energy store on the basis of the ascertained charge states and the ascertained instantaneous power demand with the aid of a control unit, the adapting being made using at least one semiconductor switch, in particular bidirectionally.

11 Claims, 1 Drawing Sheet

METHOD AND SYSTEM FOR OPERATING ELECTRICAL ENERGY STORES

FIELD OF THE INVENTION

The present invention is based on a method and to a system.

BACKGROUND INFORMATION

Methods and systems for optimizing a parallel operation of electrical energy stores are believed to be available from the related art.

A parallel operation of a plurality of accumulators of the same type is meaningful in particular in order to scale an electrical range of vehicles. The charge states of the accumulators must be similar to one another for a parallel operation so that no large equalizing currents occur from one accumulator to the other. For the same reason, a parallel operation of accumulators of different ages or different sizes with a different cell chemistry is also not easily possible.

SUMMARY OF THE INVENTION

The subject matter of the present invention is a method having the features of the independent method claim as well as a system having the features described herein. Additional features and details of the present invention result from the respective further descriptions herein, the specification and the drawing. Features and details that are described in connection with the method according to the present invention naturally also apply to the system according to the present invention, and vice versa, so that the same always applies or may apply in connection with to the disclosure pertaining to the individual invention aspects.

The method according to the present invention as defined in the main description herein is used in particular for the operation of electrical energy stores, which may be for the use in mobile systems.

The advantage of the present invention is mainly to be seen in ensuring a parallel operation of energy stores without the use of wear-susceptible relays, heavy and expensive DC/DC converters or diode circuits causing power losses, the parallel operation in particular also allowing direct charging or the recovery of braking energy into the energy stores.

The present method for the operation of electrical energy stores may be used in a vehicle, in particular in an electrical vehicle or a hybrid vehicle. According to the method of the present invention, a charge state of a first energy store is initially ascertained with the aid of an evaluation unit. At the same time or subsequent to the ascertainment of a charge state of a first energy store with the aid of an evaluation unit, the charge state of a second energy store is ascertained with the aid of an evaluation unit. The charge states are able to be ascertained by one and the same evaluation unit or also by different evaluation units. The ascertainment of the charge states of the energy stores may particularly be carried out via measurements of the open-circuit voltage or a current measurement via a shunt, for instance. Alternatively, when energy stores with a liquid electrolyte are used, the current charge state of the energy stores may also be carried out via a measurement of the acid density with the aid of an air-density meter or the like. The time interval for ascertaining the charge states of the energy stores may furthermore be freely selected or be varied as a function of additional parameters such as an instantaneous charge state of the energy stores or the instantaneous environmental conditions. In addition, in the method according to the present invention, an instantaneous power demand is ascertained with the aid of an evaluation unit subsequent to or simultaneously with the ascertainment of the charge states of the energy stores. In this context, the ascertainment of an instantaneous power demand may also be carried out either with the aid of a separate evaluation unit or also with the aid of the same evaluation unit by which the charge states of the first and/or second energy store are determined or were determined. An instantaneous power demand within the framework of the present invention in particular is to be understood as an instantaneous loading of a system which includes the energy stores according to the present invention. When the energy stores according to the present invention are used in a motor vehicle, then this may particularly be a route profile such as travel on even ground, uphill travel or downhill travel. In the same way, an instantaneous power demand may be an instantaneous tow load, transport weight or the like. In addition, an instantaneous current profile of a consumer, in particular a sudden drop in or a recovery of an intermediate circuit voltage of an inverter may be considered an instantaneous power demand. Following the ascertainment of the charge state of the energy stores as well as the ascertainment of an instantaneous power demand according to the present invention, an operation of at least one energy store is then adapted with the aid of a control unit on the basis of the ascertained charge states and the ascertained instantaneous power demand, the adaptation being carried out using at least one semiconductor switch, in particular bidirectionally. The adaptation according to the present invention may be carried out dynamically, i.e. in a continuously variable manner and especially as a function of an instantaneous driving mode. During the execution of the method according to the present invention, it may be provided that individual steps, which may be the steps of ascertaining the instantaneous charge states and the instantaneous power demand, are cyclically repeated. This could be meaningful in particular for improving the validity of the present method and possibly for increasing the accuracy of the present method. The actual adaptation then could take place only when certain limit values have been reached or have been exceeded. The use of a semiconductor switch makes it possible to replace the disadvantageous use of wear-susceptible relays, heavy and expensive DC/DC transformers or high-loss diode circuits. The semiconductor switch in particular should allow for very rapid switching, which protects the energy stores that are operated in parallel from equalization currents. The semiconductor switch may be suitable for switching high switching currents within a short period of time, such as a current of up to 20A, which may be of up to 200A, especially of up to 300A, and particularly of more than 500A, so that it is able to be used not only in small applications such as E-bikes and in E-scooters but also in larger applications such as electric motorcycles, electric cars, electronically operated trucks, boats or aviation objects, or also in stationary applications. As an alternative, software-based connection and disconnection processes may also be provided within the framework of the method according to the present invention, which should likewise be fast enough to protect the energy stores from equalization currents. A bidirectional circuit furthermore allows for a more flexible adaptation in two directions so that not only charging but discharging, too, is able to be carried out in a purposeful manner on the basis of the ascertained charge states and the ascertained instantaneous power demand.

In view of a more rapid and flexible adaptation within the framework of the present invention, it may advantageously also be provided that an adaptation of an operation of at least one energy store is carried out with the aid of at least two semiconductor switches per energy store. The semiconductor switches may be integrated into the control unit.

Within the framework of a particularly resource-sparing execution of the present invention, a short-circuit detection may be provided in addition, and when a short circuit is detected, an adaptation of the operation of at least one energy store takes place with the aid of the control unit, in particular a deactivation of at least one energy store with the aid of the control unit. Within the framework of such a development, the current circuit in which the specific energy store is integrated may be checked for power dips on a permanent basis, and when a short circuit is detected, a rapid deactivation, especially through the use of semiconductor switches, may advantageously take place again so that the energy stores are protected by a rapid deactivation. A deactivation of short circuits is problematic especially when using relays for the deactivation, which may sustain irreversible damage on account of the high currents during a short-circuit. The deactivation time of relays or fuses, too, is often so long that very high currents and damage to the energy stores or their packaging may occur prior to the separation. For example, a short-circuit detection may be carried out with the aid of a device for short-circuit detection provided within the control unit and/or by a short-circuit deactivation. Alternatively, a short-circuit detection and/or short-circuit deactivation may also be carried out via conventional overcurrent protection devices such as safety fuses, electronic fuses or the like.

In addition, it may be provided within the framework of the method of the present invention that an adaptation of an operation of at least one energy store to an instantaneous driving profile of a motor vehicle takes place, the adaptation may be carried out on the basis of a comparison of the open-circuit voltages of the energy stores to an intermediate circuit voltage. According to the present method, two energy stores, for example, having different charge capacities, cell aging or cell chemistry are thereby able to be operated next to each other in an initial state. Within the framework of the ascertainment of an instantaneous power demand according to the present invention, different power demands may now be ascertained, for instance with regard to a current driving profile, and the operation of at least one energy store is able to be suitably adapted to the ascertained instantaneous power demands.

For example, given a low power demand, e.g., when a vehicle is traveling on a level road, an evaluation unit may ascertain, for example, the instantaneous charge capacities of the energy stores via the instantaneous cell voltage or the open-circuit voltage of the energy stores and compare it/them to an instantaneous intermediate circuit voltage. If it is then registered that the open-circuit voltage of the energy stores is greater than the intermediate circuit voltage, i.e. that $E_{Bat}>E_{ZK}$, then the operation is able to be adapted in that, for example, the semiconductor switch, which may be situated on the evaluation unit, switches the system accordingly so that the energy store having the higher open-circuit voltage, i.e. the energy store having the instantaneously greater charge capacity, supplies the system.

Given a high power demand such as during uphill travel of a vehicle, the intermediate circuit voltage may then drop below the open-circuit voltage of the energy store having the lower charge capacity, whereupon the second energy store is able to be activated as well, which may be with the aid of the semiconductor switch, and both energy stores are then able to supply the intermediate circuit or the system, the current thereby distributing itself according to the internal resistances of the energy stores.

In addition to a low power demand and a high power demand, it is additionally also possible to ascertain still further power profiles to which an adaptation of the operation of at least one energy store on the basis of the ascertained charge states and the ascertained instantaneous power demand then takes place as well. For example, a driving profile of a transition from uphill travel to travel on even ground may be specified. The intermediate circuit voltage will normally increase during such travel so that the intermediate circuit voltage exceeds the open-circuit voltage or the charge capacity of a first battery, and $E_{ZK}>E_{Bat}$ occurs. In this case, the connection to the energy store having the lower open-circuit voltage may be permanently severed so that only the energy store having the higher open-circuit voltage supplies the system or the intermediate circuit.

Within the framework of the method according to the present invention, it may finally also be provided that charging of the energy stores is carried out. For example, the energy stores are able to be charged through recuperation, e.g., during downhill travel. The intermediate circuit voltage usually continues to increase during such downhill travel, until it is greater than the open-circuit voltage of the energy store having the higher open-circuit voltage or the greater charge capacity. Starting from this point, when $E_{ZK}>E_{BAT}$ applies also to the more active energy store, the current direction may be reversed and the energy store charged through recuperation. If the intermediate circuit voltage lies between the open-circuit voltages of, for example, two batteries ($E_{Bat1}>E_{ZK}>E_{Bat2}$), then only the battery having the lower charge state may be charged by the recuperation, which then comes closer to the charge state of the fuller battery ("loss-free recuperation balancing"). For reasons of maximizing the loss-free recuperation balancing, the activation of the second battery may be delayed until the recuperation energy is no longer able to be absorbed by a single battery alone.

Within the framework of a particularly energy-efficient execution of the present method, it may therefore be provided that an adaptation of an operation of at least one energy store to an instantaneous driving profile of a motor vehicle is carried out in such a way that a reversal of a current direction occurs as a result, the reversal of the current direction may cause charging of at least one energy store. Because of the detection of the current direction according to the present invention, this especially makes it possible to specify a different energy threshold for the discharging of the energy stores than for the charging. This may be useful in particular because many energy stores have different maximum values for charging and discharging, and the maximally possible charging and discharging rates are thus able to be utilized. In addition, it is conceivable for the charging of the energy stores that when the recuperation or charging is detected, it is defined, or is able to be defined, which energy store is to receive the charge. For example, this may be the energy store with the lower charge capacity or may also be determined with regard to other parameters such as the cell chemistry, the cell temperature, or other parameters.

An additional subject matter of the present invention is a system for operating electrical energy stores, in particular for carrying out an afore-described method. In this context, it is provided that the system has at least a first energy store as well as a second energy store. In addition, the system according to the present invention includes at least one evaluation unit for ascertaining an instantaneous charge state of the first and second energy store as well as an instantaneous power demand of the system. Moreover, the present system includes a control unit for adapting an operation of at least one of the energy stores on the basis of the ascertained charge states and the ascertained instantaneous power demand of the system. As a result, the system according to the present invention provides the same advantages as those already described in detail with regard to the method according to the present invention. Thanks to the system according to the present invention, it is particularly possible to operate energy stores that have different charge states, different aging and different cell chemistries in parallel with one another without having to provide wear-susceptible relays and/or heavy and expensive DC/DC converters and/or high-loss diode circuits for this purpose. In view of the advantages of the system according to the present invention, the control unit, in particular, is configured in such a way that a desired system performance is able to be provided even at different aging and charge states of the energy stores. For the control of the system according to the present invention, the individual system components may be interconnected via control and/or communications links. The control and/or communications links may be at least partially configured in a wireless or contactless and/or in at least partially wired form. Within the framework of a wired development of the system according to the present invention, the control and/or communications links may advantageously be connected to one another by way of a bus system, in particular a CAN bus system. Within the framework of a wireless or contactless development of the present system, the individual system components are advantageously able to be connected via WLAN, Bluetooth, NFC, Zigbee or the like.

In addition, it is provided within the framework of the present invention that the energy stores of the present system are configured in the form of electrical and/or electrochemical and/or chemical energy stores. Within the framework of electrical energy stores, the energy stores may particularly be configured as capacitors or super caps. With regard to a development as electrochemical energy stores, these may be configured in the form of accumulators or batteries, in particular lead as acid batteries, Li-ion batteries, NaS batteries, redox-flow batteries or the like. With regard to a development of the energy stores as chemical energy stores, these are able to be configured as fuel cells, in particular.

In order to allow a certain modularity, in particular an uncomplicated integration and retrofitability of the system according to the present invention, it may furthermore be provided that the evaluation unit includes a detection device (apparatus) for the acquisition of data for ascertaining an instantaneous charge state of a first and a second energy store and an instantaneous power demand of the system. The evaluation unit may be configured in the form of a digital evaluation unit and include sensors as the detection device (apparatus), for example, which are advantageously situated at different positions in the present system. As far as the determination of an instantaneous charge state is concerned, this particularly may involve sensors for ascertaining an instantaneous current, such as a line resistance (shunt) or Hall-effect sensors, or sensors for determining an instantaneous current direction, an instantaneous temperature, an instantaneous open-circuit voltage, an instantaneous internal resistance or a charge quantity or the like. Furthermore, with regard to an instantaneous power demand, the sensors may particularly be configured to determine a route profile, an instantaneous velocity, an instantaneously consumed power, an instantaneous headwind, an instantaneous tow or transport weight or the like. Within the framework of a particularly exact and meaningful determination of an instantaneous charge state and/or an instantaneous power demand of the system, the data acquired with the aid of the detection unit may be ascertained in particular with the aid of different sensors, the data may be averaged and/or weighted and/or possibly subjected to other statistical data evaluation methods in the process. Within the framework of an easy and efficient communication of the present system components, it may furthermore be provided that the evaluation unit includes a battery management system or the like or is linked to such a system.

With regard to an energy-efficient, cost-effective and simultaneously resource-sparing adaptation of an operation of at least one energy store on the basis of the ascertained charge states and the ascertained instantaneous power demand, it may particularly be provided according to the present invention that the control unit has at least one semiconductor switch for adapting an operation of at least one energy store. The system may include a plurality of semiconductor switches for adapting an operation of at least one energy store, which are connected to one another, and in particular are integrated into the control unit. The at least one semiconductor switch may be suitable for switching high switching currents, e.g., a current of up to 20A, which may be of up to 200A, and especially may be, of up to 300A, and in particular of more than 500A, within a short period of time.

The semiconductor switch according to the present invention may be configured as a field-effect transistor, in particular as a metal-oxide semiconductor field-effect transistor (MOSFET) and is switchable by applying a control voltage (gate-source voltage) or a control potential (gate potential). Alternatively or cumulatively, the semiconductor switch or the semiconductor switches may also be configured in the form of a thyristor or a bipolar transistor, for instance, especially in the form of an IGBT switch or SiC switch.

Another subject matter of the present invention is a motor vehicle, in particular an electric or hybrid vehicle, which includes the afore-described system. As an alternative to a motor vehicle, the present system may also be integrated into a two-wheeled vehicle, a boat, a forklift, a truck, an aviation object, a stationary device or the like, in particular.

Additional advantages, features and details of the present invention result from the following description in which exemplary embodiments of the present invention are described in detail with reference to the drawing. The features mentioned in the claims and in the specification may be essential to the present invention either on their own or in any combination.

Identical reference numerals are used in the figures for the same technical features.

DETAILED DESCRIPTION

Figure 1:
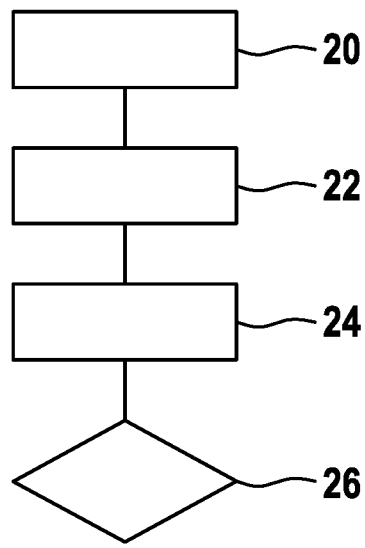
FIG. 1 shows a schematic illustration of a method according to the present invention for operating electrical energy stores, in particular for the use in motor vehicles.

FIG. 1 shows a schematic representation of a method for operating electrical energy stores 2, 4 according to the present invention, in particular for use in motor vehicles, the method including the steps 20 through 26. In a first step of the method according to the present invention, an ascertainment 20 of a charge state of a first energy store 2 takes place at the outset with the aid of a first evaluation unit 6.

In a second step, which may be carried out simultaneously with the first step, an ascertainment 22 of a charge state of a second energy store 4 also takes place with the aid of a second evaluation unit 6'. In the process, the charge states of energy stores 2, 4 may alternatively also be ascertained using the same evaluation unit 6, 6'; the ascertainment 22, 24 of the charge states of energy stores 2, 4 may be carried out by a measurement of a current such as via a shunt or an open-circuit voltage or the like, for example.

In a third step of the method according to the present invention, which is also carried out either simultaneously with or at a time offset from the first and/or second step of the present method, an instantaneous power demand is ascertained with the aid of one of evaluation units 6, 6'. Ascertainment 24 may alternatively also take place using a separate evaluation unit 4", which is not explicitly illustrated here. In this context, an instantaneous power demand is particularly to be understood as an instantaneous loading of a system that is carrying out the method according to the present invention. For instance, this may be an instantaneous driving profile such as uphill travel or downhill travel or something similar, or also an instantaneous transport or tow weight or the like.

Following steps 1 through 3, an adaptation 26 of an operation of at least one electrical energy store 2, 4 finally takes place in a fourth step of the present method on the basis of the ascertained charge states and the ascertained instantaneous power demands, with the aid of a control unit 8. Adaptation 26 may be carried out after ascertainment 20, 22, 24 of the charge states of energy stores 2, 4 and the instantaneous power demand according to the present invention. An adaptation 26 of an operation of at least one energy store 2, 4 may be carried out with the aid of at least one semiconductor switch 10, which may be able to be integrated into control unit 8 and thereby replaces the use of wear-susceptible relays, heavy and expensive DC/DC converters or high-loss diode switches. In this context, adaptation 26 of an operation of at least one energy store 2, 4 may take place in particular to an instantaneous driving profile of a motor vehicle, in which case adaptation 26 may then be performed based on a comparison of the open-circuit voltages of energy stores 2, 4 to an intermediate circuit voltage. With regard to an instantaneous driving profile, different states, e.g., an initial state, a state of a low power demand, a state of a high power demand, a state of uphill travel to travel on even ground or uphill travel, for instance, may be distinguished.

Furthermore, with regard to the most reliable execution of the method according to the present invention, the individual steps of the present method may be repeated, which may be in a cyclical manner. It is particularly advantageous in this context if the first three steps 20, 22 and 24 of the method according to the present invention are cyclically repeated and the fourth step of an adaptation 26 of an operation of at least one energy store is carried out only when certain limit values have been reached or exceeded.

In addition, it may also be provided within the framework of the present method that an adaptation 26 of an operation of at least one energy store 2, 4 to an instantaneous driving profile of a motor vehicle is carried out in such a way that a reversal of a current direction takes place, the reversal of the current direction may result in charging of at least one energy store. Within the framework of a charging operation, energy stores 2, 4 of a motor vehicle are able to be charged, which may be by recuperation or something similar.

Figure 2:
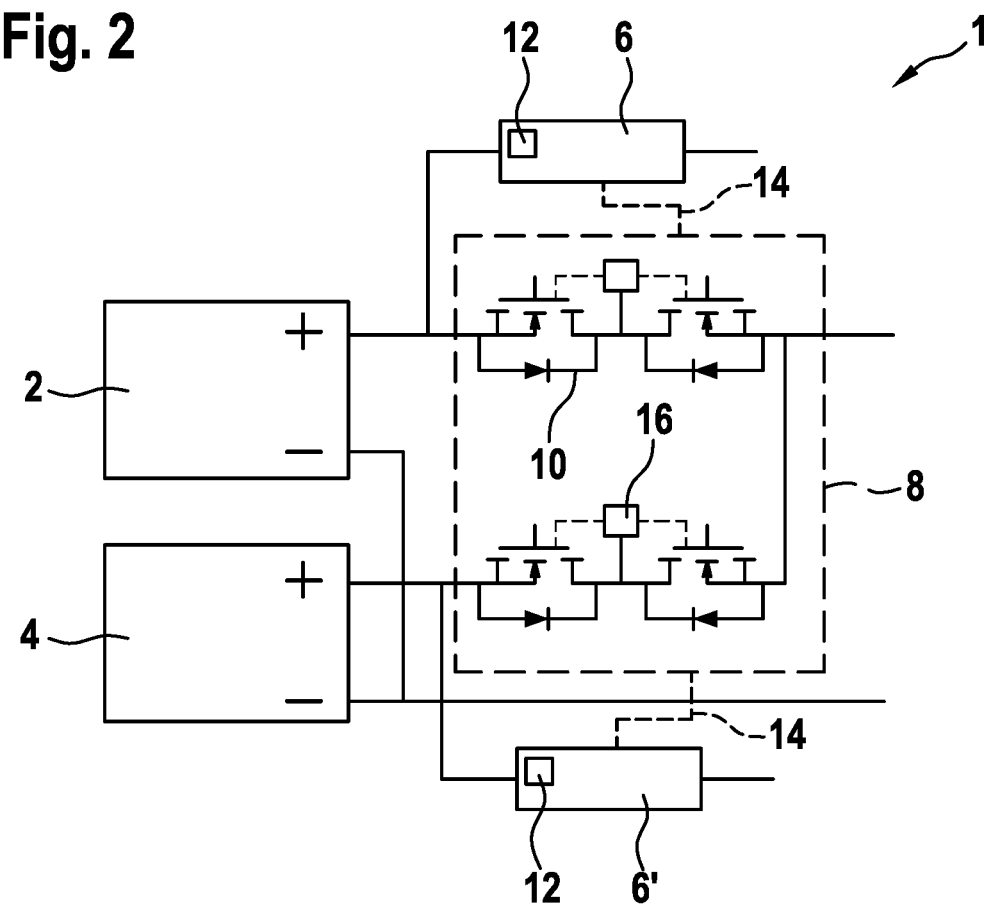
FIG. 2 shows a schematic illustration of a system for operating electrical energy stores according to the present invention.

FIG. 2 shows a schematic illustration of a system 1 for operating electrical energy stores 2, 4 according to the present invention. Present system 1 includes a first energy store 2, a second energy store 4 as well as a first evaluation unit 6 and a second evaluation unit 6' for ascertaining an instantaneous charge state of first and second energy stores 2, 4 as well as an instantaneous power demand of system 1.

Within the framework of a particularly compact and simple arrangement of present system 1, it is also possible to use only one evaluation unit 6 or 6', which carries out the ascertainment of an instantaneous charge state of the first and second energy stores 2, 4 and also ascertains an instantaneous power demand of system 1. In this instance, energy stores 2, 4 are particularly configured in the form of electrical and/or electrochemical and/or chemical energy stores, such as capacitors, super caps, accumulators, batteries, fuel cells or the like.

In this instance, a detection device (apparatus) 12, which may be implemented as sensors or the similar devices, are situated inside evaluation units 6, 6' and ascertain the charge state of energy stores 2, 4 based on measurements of the instantaneous open-circuit voltage of, for example, an instantaneous current or the like. These may be current measuring resistors such as shunts or Hall-effect sensors or similar devices, in particular. Within the framework of an especially exact and meaningful determination of an instantaneous charge state and/or an instantaneous power demand of system 1, the data acquired with the aid of detection units 12 may particularly be ascertained with the aid of different sensors 12, the data may be averaged and/or weighted and/or subjected to other statistical data evaluation methods.

In addition to energy stores 2, 4 as well as evaluation units 6, 6', present system 1 also includes a control unit 8 for adapting 26 an operation of at least one energy store 2, 4 on the basis of the ascertained charge states and the ascertained instantaneous power demands of system 1, control unit 8 being connected to evaluation units 6, 6' via a communications and control line 14 in each case.

In this case, control unit 8 has four semiconductor switches 10 for adapting an operation of energy stores 2, 4, which in this instance are configured as field-effect transistors, in particular as metal-oxide semiconductor field-effect transistors (MOSFETs) and are switchable by an application of a control voltage (gate source voltage) or a control potential (gate potential). Alternatively or cumulatively, the semiconductor switches may also be configured in the form of thyristors or bipolar transistors, in particular IGBT switches or SiC switches. Because of the arrangement of semiconductor switches 10 according to the present invention, it is especially possible to dispense with the use of wear-susceptible relays, heavy and expensive DC/DC converters or high-loss diode switches and thus to ensure an energy-efficient, cost-effective and simultaneously resource-sparing operation of electrical energy stores. In particular, the semiconductor switches are capable of switching high switching currents within a short period of time, the switches, for example, being able to switch a current of up to 20A, which may be of up to 200A, especially of up to 300A, and in particular of more than 500A. In an advantageous manner, a short-circuit detection 16 for detecting a short circuit is additionally situated within control unit 8, which is advantageously also suitable for deactivating a short circuit. When using short circuit detection 16, a connection to the energy stores is able to be interrupted, e.g., by a suitable lowering of the control voltage to 0V, for instance, or a negative potential at the gate. Alternatively, a short circuit detection 16 and/or a short circuit deactivation may also be formed by conventional overcurrent protection devices such as safety fuses, electronic fuses or the like.

What is claimed is:

1. A method for operating an electrical energy store, in particular for use in a motor vehicle, the method comprising:
    ascertaining a charge state of a first energy store with an evaluation unit;
    ascertaining a charge state of a second energy store with an evaluation unit, the first energy store being separate from the second energy store;
    ascertaining an instantaneous power demand with an evaluation unit; and
    adapting an operation of at least one energy store of the first energy store and the second energy store based on the ascertained charge states and the ascertained instantaneous power demand with a control unit, the adaptation being carried out with at least one semiconductor switch;
    wherein the at least one semiconductor switch includes at least two bi-directional semiconductor switches connected to each other in series for each energy store of the first energy store and the second energy store, the at least two bi-directional semiconductor switches for the first energy store being separate from the at least two bi-directional semiconductor switches for the second energy store.

2. The method of claim 1, further comprising:
    detecting a short circuit detection; and
    adapting with the control unit, when a short circuit is detected, the operation of at least one of the first and second energy stores by deactivating the at least one of the first and second energy stores.

3. The method of claim 1, wherein the operation of the at least one energy store is adapted to an instantaneous driving profile of the motor vehicle.

4. The method of claim 1, wherein an adaptation of an operation of the at least one energy store to an instantaneous driving profile of the motor vehicle is carried out so that a reversal of a current direction occurs as a result.

5. A system for operating electrical energy stores, comprising:
    a first energy store;
    a second energy store separate from the second energy store;
    at least one evaluation unit for ascertaining an instantaneous charge state of a first energy store and a second energy store and an instantaneous power demand of the system; and
    a control unit to adapt an operation of at least one energy store of the first energy store and the second energy store based on the ascertained charge states and the ascertained instantaneous power demand of the system, wherein the control unit is configured to adapt the operation using a plurality of semiconductor switches;
    wherein the plurality of semiconductor switches includes at least two bi-directional semiconductor switches connected to each other in series for each energy store of the first energy store and the second energy store, the at least two bi-directional semiconductor switches for the first energy store being separate from the at least two bi-directional semiconductor switches for the second energy store.

6. The system of claim 5, wherein the first and second energy stores include at least one of an electrical energy store, an electrochemical energy store, and/or a chemical energy store.

7. The system of claim 5, wherein the evaluation unit includes a detection device to acquire data for ascertaining an instantaneous charge state of the first energy store and the second energy store and an instantaneous power demand of the system.

8. A motor vehicle, comprising:
    a system for operating electrical energy stores, including:
        a first energy store;
        a second energy store separate from the first energy store;
        at least one evaluation unit for ascertaining an instantaneous charge state of a first energy store and a second energy store and an instantaneous power demand of the system; and
    a control unit to adapt an operation of at least one energy store of the first energy store and the second energy store based on the ascertained charge states and the ascertained instantaneous power demand of the system, wherein the control unit is configured to adapt the operation using a plurality of semiconductor switches;
    wherein the plurality of semiconductor switches includes at least two bi-directional semiconductor switches connected to each other in series for each energy store of the first energy store and the second energy store, the at least two bi-directional semiconductor switches for the first energy store being separate from the at least two bi-directional semiconductor switches for the second energy store.

9. The motor vehicle of claim 8, wherein the motor vehicle is an electric vehicle or a hybrid vehicle.

10. The method of claim 1, wherein an adaptation of an operation of the at least one energy store to an instantaneous driving profile of a motor vehicle is carried out so that a reversal of a current direction occurs as a result, the reversal of the current direction causing charging of the at least one energy store.

11. A method for operating an electrical energy store for a motor vehicle, the method comprising:
    ascertaining a charge state of a first energy store with an evaluation unit;
    ascertaining a charge state of a second energy store with an evaluation unit;
    ascertaining an instantaneous power demand with an evaluation unit;
    adapting an operation of at least one energy store of the first energy store and the second energy store based on the ascertained charge states and the ascertained instantaneous power demand with a control unit, the adaptation being carried out with at least one semiconductor switch;
    wherein the operation of the at least one energy store is adapted to an instantaneous driving profile of the motor vehicle, and wherein the adaptation is carried out based on a comparison of open-circuit voltages of the first and second energy stores to an intermediate circuit voltage.

* * * * *